US012631882B2

(12) United States Patent
     Woods

(10) Patent No.: US 12,631,882 B2
(45) Date of Patent: *May 19, 2026

(54) LIGHT PROJECTOR

(71) Applicant: Snap Inc., Santa Monica, CA (US)

(72) Inventor: David Woods, Chinnor (GB)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/334,137

(22) Filed: Jun. 13, 2023

(65) Prior Publication Data

US 2023/0324697 A1 Oct. 12, 2023

Related U.S. Application Data

(63) Continuation of application No. 16/960,311, filed as application No. PCT/GB2019/050031 on Jan. 7, 2019, now Pat. No. 11,733,520.

(30) Foreign Application Priority Data

Jan. 17, 2018 (GB) ...................................... 1800762

(51) Int. Cl.
     *G02B 27/01* (2006.01)
     *G02B 5/30* (2006.01)
     *G02B 27/28* (2006.01)

(52) U.S. Cl.
     CPC ....... *G02B 27/0172* (2013.01); *G02B 5/3083* (2013.01); *G02B 27/0176* (2013.01);
     (Continued)

(58) Field of Classification Search
     CPC .............. G02B 27/0172; G02B 5/3083; G02B 27/0176; G02B 27/283; G02B 2027/0112; G02B 2027/0152
     (Continued)

(56) References Cited

U.S. PATENT DOCUMENTS 4,764,011 A 8/1988 Goldstein
5,596,451 A 1/1997 Handschy et al.
            (Continued)

FOREIGN PATENT DOCUMENTS

CN 101446684 B 4/2011
CN 103309035 B 12/2016
            (Continued)

OTHER PUBLICATIONS

"U.S. Appl. No. 16/960,311, 312 Amendment filed Jun. 12, 2023", 6 pgs.

(Continued)

*Primary Examiner* — Balram T Parbadia
*Assistant Examiner* — Grant A Gagnon
(74) *Attorney, Agent, or Firm* — Schwegman Lundberg & Woessner, P.A.

(57) ABSTRACT

A light projector for an augmented reality headset is disclosed. First and second optical arrangements receive light from a polarising beam splitter so that light is reflected, focused and directed back towards the polarising beam splitter from each optical arrangement. The first and second optical arrangements comprise first and second mirrors and first and second quarter-wave plates. The polarising beam splitter receives and combines light from the first and second optical arrangements so that the combined light, which is unpolarised, is provided to an exit pupil. The first and second optical arrangements are angled relative to one another so that the image from the first optical arrangement is aligned with the image from the second optical arrangement.

20 Claims, 2 Drawing Sheets

(52) U.S. Cl.
CPC .... *G02B 27/283* (2013.01); *G02B 2027/0112* (2013.01); *G02B 2027/0152* (2013.01)

(58) Field of Classification Search
USPC ......................................................... 359/489
See application file for complete search history.

(56) References Cited

U.S. PATENT DOCUMENTS

| | | | |
|---|---|---|---|
| 5,884,991 | A | 3/1999 | Levis et al. |
| 6,256,151 | B1 | 7/2001 | Ma et al. |
| 2002/0101664 | A1 | 8/2002 | King et al. |
| 2008/0247048 | A1 | 10/2008 | Francois et al. |
| 2010/0002154 | A1 | 1/2010 | Hua |
| 2013/0169894 | A1 | 7/2013 | Ouderkirk et al. |
| 2014/0211322 | A1 | 7/2014 | Bohn et al. |
| 2015/0098029 | A1 | 4/2015 | Sato et al. |
| 2015/0177591 | A1 | 6/2015 | Sugiyama et al. |
| 2016/0041390 | A1 | 2/2016 | Poon et al. |
| 2016/0077338 | A1 | 3/2016 | Robbins et al. |
| 2017/0227764 | A1 | 8/2017 | Kim et al. |
| 2017/0242264 | A1 | 8/2017 | Sissom |
| 2018/0324402 | A1 | 11/2018 | Lowney et al. |
| 2020/0341281 | A1 | 10/2020 | Woods |
| 2021/0223549 | A1 | 7/2021 | Maimone et al. |
| 2022/0244679 | A1 | 8/2022 | Volkov et al. |
| 2023/0418066 | A1 | 12/2023 | Russo |
| 2023/0418071 | A1 | 12/2023 | Russo et al. |

FOREIGN PATENT DOCUMENTS

| | | |
|---|---|---|
| CN | 107209445 A | 9/2017 |
| CN | 209265083 U | 8/2019 |
| CN | 111630417 A | 9/2020 |
| CN | 119404129 A | 2/2025 |
| EP | 0584802 A1 | 3/1994 |
| EP | 1069451 A2 | 1/2001 |
| EP | 3740794 A1 | 11/2020 |
| EP | 3740794 B1 | 3/2022 |
| GB | 2570302 A | 7/2019 |
| TW | 201940926 A | 10/2019 |
| TW | 1696850 B | 6/2020 |
| WO | WO-2010057272 A1 | 5/2010 |
| WO | WO-2013033274 A1 | 3/2013 |
| WO | WO-2016132584 A1 | 8/2016 |
| WO | WO-2019141967 A1 | 7/2019 |
| WO | 2021016045 | 1/2021 |
| WO | WO-2023249844 A1 | 12/2023 |
| WO | WO-2023249844 A8 | 10/2024 |

OTHER PUBLICATIONS

"U.S. Appl. No. 16/960,311, Examiner Interview Summary mailed Sep. 1, 2022", 2 pgs.

"U.S. Appl. No. 16/960,311, Examiner Interview Summary mailed Dec. 16, 2022", 2 pgs.

"U.S. Appl. No. 16/960,311, Final Office Action mailed Jun. 22, 2022", 12 pgs.

"U.S. Appl. No. 16/960,311, Non Final Office Action mailed Mar. 16, 2022", 9 pgs.

"U.S. Appl. No. 16/960,311, Non Final Office Action mailed Oct. 5, 2022", 17 pgs.

"U.S. Appl. No. 16/960,311, Notice of Allowance mailed Mar. 20, 2023", 12 pgs.

"U.S. Appl. No. 16/960,311, Preliminary Amendment filed Jul. 6, 2020", 6 pgs.

"U.S. Appl. No. 16/960,311, Response filed Jan. 4, 2023 to Non Final Office Action mailed Oct. 5, 2022", 8 pgs.

"U.S. Appl. No. 16/960,311, Response filed Jun. 7, 2022 to Non Final Office Action mailed Mar. 16, 2022", 12 pgs.

"U.S. Appl. No. 16/960,311, Response filed Aug. 22, 2022 to Final Office Action mailed Jun. 22, 2022", 10 pgs.

"Chinese Application Serial No. 201980009073.8, Office Action mailed Mar. 10, 2022", w/ English translation, 21 pgs.

"Chinese Application Serial No. 201980009073.8, Office Action mailed Jul. 5, 2022", w/ English Translation, 17 pgs.

"Chinese Application Serial No. 201980009073.8, Office Action mailed Aug. 19, 2021", w/ English translation, 18 pgs.

"Chinese Application Serial No. 201980009073.8, Office Action mailed Nov. 17, 2022", 14 pgs.

"International Application Serial No. PCT/GB2019/050031, International Preliminary Report on Patentability mailed Apr. 17, 2020", 6 pgs.

"International Application Serial No. PCT/GB2019/050031, International Search Report mailed Apr. 9, 2019", 3 pgs.

"International Application Serial No. PCT/GB2019/050031, Written Opinion mailed Arp. 9, 2019", 9 pgs.

"United Kingdom Application Serial No. GB1800762.5, Search Report under Section 17(5) mailed Jul. 23, 2018", 3 pgs.

U.S. Appl. No. 16/960,311, filed Jul. 6, 2020, Light Projector.

U.S. Appl. No. 18/305,953, filed Apr. 24, 2023, Augmented Reality Waveguides With Dynamically Addressable Diffractive Optical Elements.

"U.S. Appl. No. 16/960,311, PTO Response to Rule 312 Communication mailed Jul. 17, 2023", 3 pgs.

"Chinese Application Serial No. 201980009073.8, Decision of Rejection mailed Nov. 17, 2022", W/O English Translation, 7 pgs.

"Chinese Application Serial No. 202380048678.4, Voluntary Amendment filed Apr. 24, 2025", w/ English Claims, 9 pgs.

"European Application Serial No. 19700438.5, Response to Communication pursuant to Rules 161(2) and 162 EPC filed Jan. 22, 2021", 21 pgs.

"International Application Serial No. PCT/GB2019/050031, Response to Written Opinion and Article 34 Amendments filed Aug. 14, 2019", 5 pgs.

"International Application Serial No. PCT/US2023/025222, International Preliminary Report on Patentability mailed Jan. 2, 2025", 8 pgs.

"International Application Serial No. PCT/US2023/025222, International Search Report mailed Oct. 9, 2023", 3 pgs.

"International Application Serial No. PCT/US2023/025222, Written Opinion mailed Oct. 9, 2023", 6 pgs.

"Taiwanese Application Serial No. 108101766, Office Action mailed Dec. 4, 2019", w/ English machine translation, 11 pgs.

"United Kingdom Application Serial No. 1714414.8, Search Report under Section 17(5) mailed Feb. 27, 2018", 4 pgs.

"European Application Serial No. 23739732.8, Response to Communication pursuant to Rules 161 and 162 EPC filed Jul. 28, 2025", 11 pgs.

"U.S. Appl. No. 18/305,953, Non Final Office Action mailed Oct. 31, 2025", 11 pgs.

"Chinese Application Serial No. 201980009073.8, Decision of Reexamination mailed Mar. 23, 2026", w/ English machine translation, 20 pgs.

"European Application Serial No. 23739732.8, Communication pursuant to Article 943 EPC mailed Apr. 13, 2026", 5 pgs.

"Chinese Application Serial No. 201980009073.8, Notice of Reexamination mailed Jan. 29, 2026", w/ English translation, 17 pgs.

LIGHT PROJECTOR

This application is a continuation of U.S. patent application Ser. No. 16/960,311, filed Jul. 6, 2020, which is a U.S. national-phase application filed under 35 U.S.C. § 371 from International Application Serial No. PCT/GB2019/050031, filed Jan. 7, 2019, and published as WO 2019/141967 on Jul. 25, 2019, which claims the benefit of priority to GB Patent Application Serial No. 1800762.5, filed Jan. 17, 2018, each of which are incorporated herein by reference in their entireties.

The present disclosure relates to a light projector, in particular a light projector for augmented reality or virtual reality applications.

In an augmented reality headset a transparent waveguide is provided in front of a user's eye or eyes. A light projector transmits light towards the waveguide. Light from the projector can be coupled into the waveguide by an input diffraction grating.

Light then propagates within the waveguide by total internal reflection and an output diffraction grating couples light out of the waveguide and towards a viewer. In use, a viewer can see light from their external environment, transmitted through the transparent waveguide, as well as projected light from the projector. This can provide an augmented reality experience.

Bird bath projectors have been used for generating an image to be transmitted towards an augmented reality waveguide. An operational principle of bird bath projectors is that they provide light in a first direction and then focus light for output in a second direction that is perpendicular to the first direction. Beam splitters are typically used in bird bath designs in order to turn light through 90°. These designs can operate with high efficiency when the input light is linearly polarised.

Co-pending patent application GB 1714414.8 describes a bird bath projector that uses a liquid crystal on silicon (LCOS) panel to generate an image in reflected light. Generally LCOS panels are illuminated with linearly polarised light. LCOS panel pixels can be set to 'bright' or 'dark'. In one arrangement 'dark' pixels reflect light with its polarisation state unchanged. 'Bright' pixels can reflect light with its polarisation state shifted or transformed. The 'bright' and 'dark' pixels can then be separated using a polarisation filter such as a polarisation beam splitter that will only pass light from the 'bright' pixels. In this way, light from 'dark' pixels can be filtered so that it does not progress towards an exit pupil and the augmented reality waveguide. This design is very effective. However, it is only suitable where the input light is linearly polarised.

Unpolarised light sources can be used, but only if they are first passed through a linear polarisation filter, which typically rejects around 50% of the unpolarised incident light. It would be desirable to produce a projector that can make use of unpolarised light sources while operating with higher efficiency.

An objective in the field of augmented reality is to provide a full colour wearable display with projected light. A number of challenges are presented for light projectors within these wearable displays. Batteries in a wearable display need to be kept small and lightweight, and therefore battery resources need to be carefully managed. In addition, optical components need to be made compact and robust so that they can be easily integrated within a headset that can withstand rough treatment.

The present disclosure addresses some of these issues.

According to an aspect of the disclosure there is provided a light projector for an augmented reality headset, comprising: an image generator configured to provide an image with unpolarised light; a beam splitter configured to receive unpolarised light from the image generator and to split it into a first path and a second path; a first optical arrangement configured to receive light from the beam splitter in the first path so that light is reflected, focused and directed back towards the beam splitter; and a second optical arrangement configured to receive light from the beam splitter in the second path so that light is reflected, focused and directed back towards the beam splitter, wherein the first and second optical arrangements comprise first and second mirrors; wherein the beam splitter is configured to receive and combine light from the first and second optical arrangements so that the combined light, which is unpolarised, is provided to an exit pupil, and wherein the first and second optical arrangements are angled relative to one another so that the image from the first path is aligned with the image from the second path.

In this way, unpolarised light can be output from a projector with high efficiency. The efficiency of the projector is optimised because, following interaction with a beam splitter, light from the first and second paths can be combined and provided to the exit pupil. This can advantageously reduce the power consumption of the projector which can help to conserve limited battery resources in an augmented reality headset.

Preferably the first and second mirrors have an optical power to focus light; for example, the mirrors may be concave. The concave mirrors, which are preferably spherical, can focus and reflect light in the first and second paths so that images from the respective paths can be provided to the exit pupil for injection into an augmented reality waveguide. In some embodiments the first and second optical arrangements may comprise an additional component, such as a lens, that provides an optical power to focus or collimate the light.

Preferably the beam splitter is a polarising beam splitter that is configured to reflect linearly polarised light of a first orientation and to transmit linearly polarised light of a second orientation, wherein the first orientation is orthogonal to the second orientation. Thus, unpolarised light from the image generator can be divided into linearly polarised components in the two split paths. Light returned from the first and second paths can then be recombined at the polarising beam splitter so that unpolarised light can be provided at the exit pupil. Use of a polarising beam splitter is advantageous because it means that the projector can operate with a very high efficiency—close to 100%.

The first and second optical components may comprise quarter-wave plates. Light can encounter the quarter-wave plates twice in each of the first and second optical paths. In this way, the quarter-wave plate can transform linearly polarised light from the polarising beam splitter into circularly polarised light. The handedness of the circularly polarised light can be reversed by a reflection from the mirror. A second interaction with the quarter-wave plate can then transform the circularly polarised light into linearly polarised light with an orientation that is perpendicular to the orientation of the original polarisation. Thus, light that was originally transmitted by the polarising beam splitter along the first optical path can be reflected when it interacts with the beam splitter for a second time. Equally, light that was originally reflected by the polarising beam splitter along the second optical path can be transmitted when it interacts with the beam splitter for a second time. This can produce a compact optical system that operates with high efficiency.

The beam splitter may comprise a partially reflective surface for unpolarised light. For example, the beam splitter may be half-silvered or it may include a dichroic optical coating. These beam splitters preferably transmit and reflect around 50% of incident light and they are generally insensitive to its polarisation state.

Preferably the image generator is a LED array. Micro LED arrays can provide full colour images in a very small area. The light output from these arrays is typically unpolarised. A full colour image may be produced by high frequency operation of red, green and blue LEDs so that the combination of these individual components is perceived by the human eye as a full colour image. In other arrangements unpolarised images may be optically relayed to the beam splitter from a variety of alternative sources.

The beam splitter is preferably a rectangular cuboid comprising a top face, a bottom face, and four side faces. The first optical arrangement, the second optical arrangement, the exit pupil and the image generator are preferably attached to respective side faces. This can provide a compact and physically robust design where all of the necessary components are attached or bonded to the beam splitter. Thus, the beam splitter, which is preferably cubic, can form the building block on which the other components are securely mounted.

According to another aspect of the disclosure there is provided an augmented reality headset comprising: the light projector as previously defined; a power source configured to supply electrical energy to the light projector; a waveguide configured to receive light from the light projector exit pupil and to couple it towards a viewer; and a mounting adapted to fit on the viewer's head. The power source can be provided with a longer lifetime due to the increased efficiency of the projector. Alternatively, a smaller battery can be provided with a similar lifetime in comparison to previous batteries for use with lower efficiency projectors.

According to yet another aspect of the disclosure there is provided a method of assembling a light projector for an augmented reality headset, comprising the steps of: providing an image generator configured to provide an image with unpolarised light; arranging a beam splitter to receive unpolarised light from the image generator and to split it into a first path and a second path; arranging a first optical arrangement including a first mirror to reflect and focus light in the first path so that the light is directed towards the beam splitter; arranging a second optical arrangement including a second mirror to reflect and focus light in the second path so that the light is directed towards the beam splitter; and aligning the first and second optical arrangements so that the image from the first path is aligned with the image from the second path when they are combined by the beam splitter and provided to an exit pupil as unpolarised light.

Embodiments of the disclosure are now described, by way of example, with reference to the drawings, in which.

Figure 1:
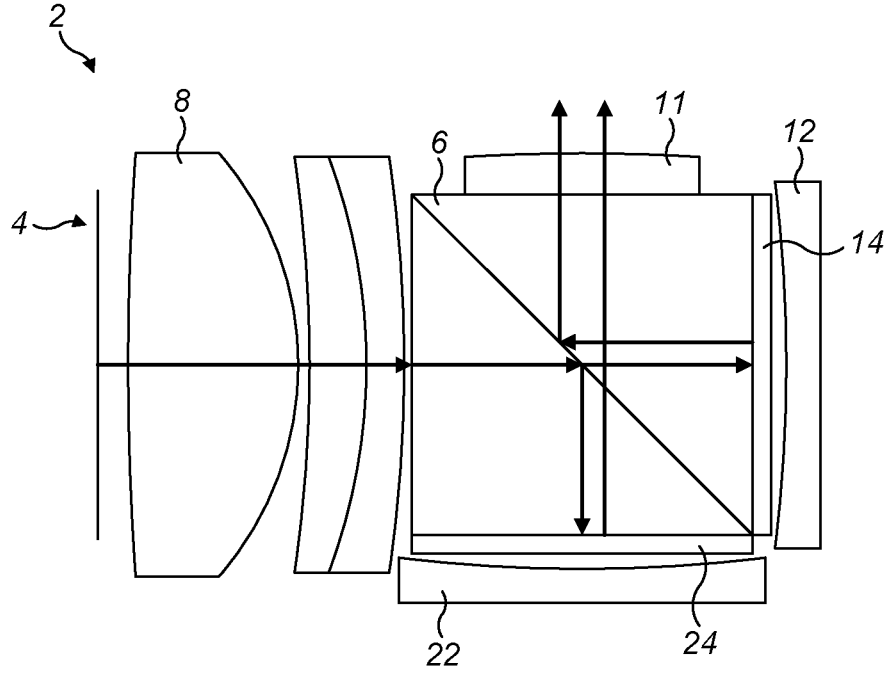
FIG. 1 is a plan view of a light projector in an embodiment of the disclosure.

FIG. 1 shows a light projector 2 comprising an illumination source 4. In this example the illumination source 4 is a micro LED array including individual red, green and blue LEDs. The individual LEDs can be controlled to generate an image. Red, green and blue LEDs are operated sequentially at a high frequency so that the human eye only perceives the cumulative effect of the individual colours in order to provide a full colour image. The light output from the illumination source 4 is unpolarised. Any type of illumination source using unpolarised light could be used, as an alternative to a micro LED array, with the image relayed to the position of the illumination source 4.

The light projector 2 includes a polarising beam splitter 6 such as a wire grid polariser, a field lens array 8 which includes a doublet lens, a first spherical mirror 12, a first quarter-wave plate 14, a second spherical mirror 22 and a second quarter-wave plate 24. Light projectors of this type including spherical mirrors are sometimes referred to as bird bath projectors.

The cubic polarising beam splitter 6 is made of N-BK7 and has dimensions of 8.5×8.5×11.5 mm (and is not therefore a cube in the strict geometric sense). The air-glass surfaces of the beam splitter 6 have a broadband anti-reflection coating applied. The active surface of the beam splitter 6 is arranged to reflect s-polarised light and transmit p-polarised light. The unpolarised light from the illumination source 4 is split into first and second paths by the beam splitter 6 where the first path comprises p-polarised light and the second path comprises s-polarised light.

The first optical path with p-polarised light is transmitted on the first interaction with the beam splitter 6. The light is then incident on the first quarter-wave plate 14, which is attached to one surface of the beam splitter 6. The first quarter-wave plate 14 receives p-polarised light from the polarising beam splitter 6 and transforms it into right-hand circularly polarised light. The first spherical mirror 12 reflects and collimates the light. The handedness of the polarised light is reversed upon reflection so that it becomes left-hand circularly polarised.

The reflected light from the first spherical mirror 12 encounters the first quarter-wave plate 14 once more as it passes back towards the beam splitter 6. The first quarter-wave plate 14 receives left-hand circularly polarised light and transforms it into s-polarisation. The collimated s-polarised light is reflected by the polarising beam splitter 6 with high efficiency at the active surface. The light can then exit the polarising beam splitter 6 where it is received at a pupil lens 11. Light from the pupil lens 11 can be directed towards an augmented reality waveguide (not shown). A fold prism (not shown) with a high refractive index can be used to reflect the optical path towards an input grating of the augmented reality waveguide.

The second optical path with s-polarised light is reflected on the first interaction with the beam splitter 6. The s-polarised light extends towards the second quarter-wave plate 24 which is bonded to a surface of the beam splitter 6. The second quarter-wave plate 24 receives s-polarised light and transforms it into left-hand circularly polarised light. The second spherical mirror 22 reflects and collimates the light. The handedness of the polarised light is reversed upon reflection so that it becomes right-hand circularly polarised. The reflected light from the second spherical mirror 22 encounters the second quarter-wave plate 24 once more as it passes back towards the beam splitter 6. The second quarter-wave plate 24 receives right-hand circularly polarised light and transforms it into p-polarisation. The collimated p-polarised light is transmitted by the polarising beam splitter 6 with high efficiency at the active surface. The p-polarised light from the second optical path is then combined with s-polarised light from the first optical path and, together, they are combined to form unpolarised light that can exit the polarising beam splitter 6 towards the pupil lens 11.

The field lens 8 is configured to control rays from the illumination source 4 and to balance the aberrations generated within the polarising beam splitter 6 and the first and second spherical mirrors 12, 22.

The image produced by the illumination source 4 is carried by light in both the first and second optical paths. It is important that the images from the two optical paths are aligned when the light from the first and second optical paths is re-combined at the beam splitter 6. Any misalignment would result in two separate images being visible, which is undesirable.

The images from the first and second optical paths are aligned during assembly of the projector 2. The first mirror 12 is fixedly attached to the beam splitter 6. The second mirror 22 is movable, and its position can be adjusted. During assembly a test image is produced by the illumination source 4. The position and/or orientation of the second mirror 22 is adjusted until the images from the first and second paths are precisely aligned. The second mirror 22 can then be fixed in position. All of the optical components in the projector 2 are attached to surfaces of the cubic beam splitter 6. It is therefore unlikely that components could become misaligned after assembly, even under rough treatment.

Figure 2:
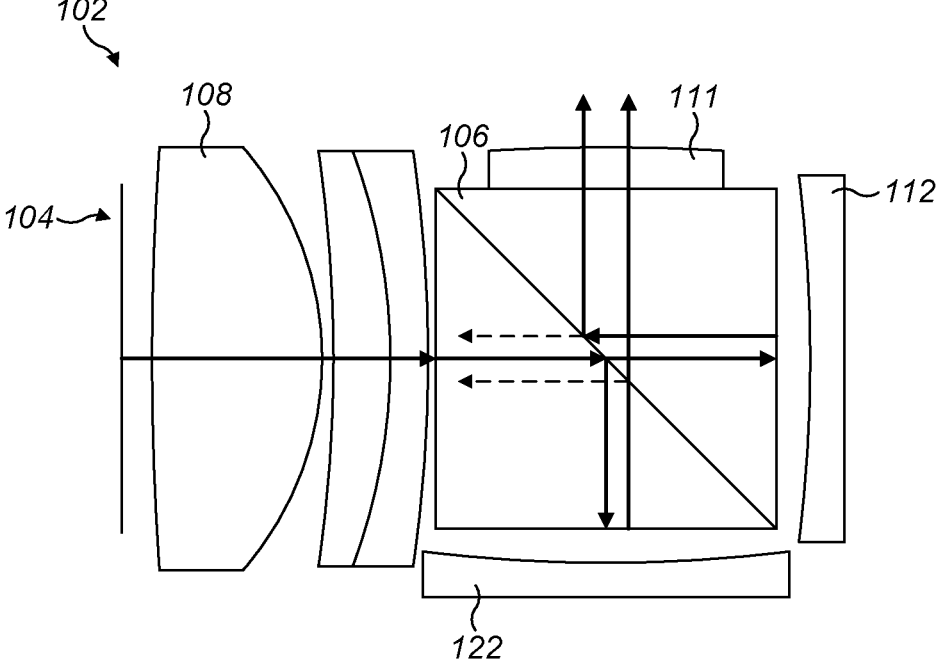
FIG. 2 is a plan view of a light projector in another embodiment of the disclosure.

FIG. 2 is a plan view of a light projector 102 in another embodiment of the disclosure. In this embodiment the beam splitter 106 has a partially reflective active surface for unpolarised light. In one example the beam splitter may be half-silvered or it may include a dichroic optical coating. These beam splitters typically transmit and reflect around 50% of incident light with no sensitivity to the polarisation of the incident light. There are no quarter-wave plates attached to the beam splitter 106 in this embodiment.

In this example an image is generated by the illumination source 104 using unpolarised light. The unpolarised light from the illumination source 104 is split into first and second paths by the beam splitter 106, and approximately half of the incident light is provided to the first path and half of the incident light is provided to the second path.

The first optical path comprises unpolarised light that is transmitted on the first interaction with the beam splitter 106. The light is then incident on the first spherical mirror 112 which collimates the light and reflects it back towards the beam splitter 106. At the second interaction with the beam splitter 106 light around half of the light is transmitted and around half of the light is reflected. The reflected light extends towards the exit pupil 111 where it can exit the projector 102. The transmitted light extends back towards the illumination source 104.

The second optical path comprises unpolarised light that is reflected on the first interaction with the beam splitter 106. The light is then incident on the second spherical mirror 122 which collimates the light and reflects it back towards the beam splitter 106. At the second interaction with the beam splitter 106 light around half of the light is transmitted and around half of the light is reflected. The transmitted light is re-combined with the reflected light from the first optical path. The re-combined light, which is unpolarised, extends towards the exit pupil 111 where it can exit the projector 102. In the second optical path, light that is reflected on the second interaction with the beam splitter 106 extends back towards the illumination source 104.

Light that extends back towards the illumination source 104 is 'wasted' light in this arrangement because it does not exit the projector 102 towards an augmented reality waveguide. Therefore, in this arrangement, the maximum optical efficiency of the projector is around 50%. Embodiments using partially reflective beam splitters are therefore less preferred than embodiments that use polarisation beam splitters.

The optical system comprises optical components that have planar or spherical surfaces only. There are no aspherical components present, which advantageously reduces the cost of the projector.

Figure 3:
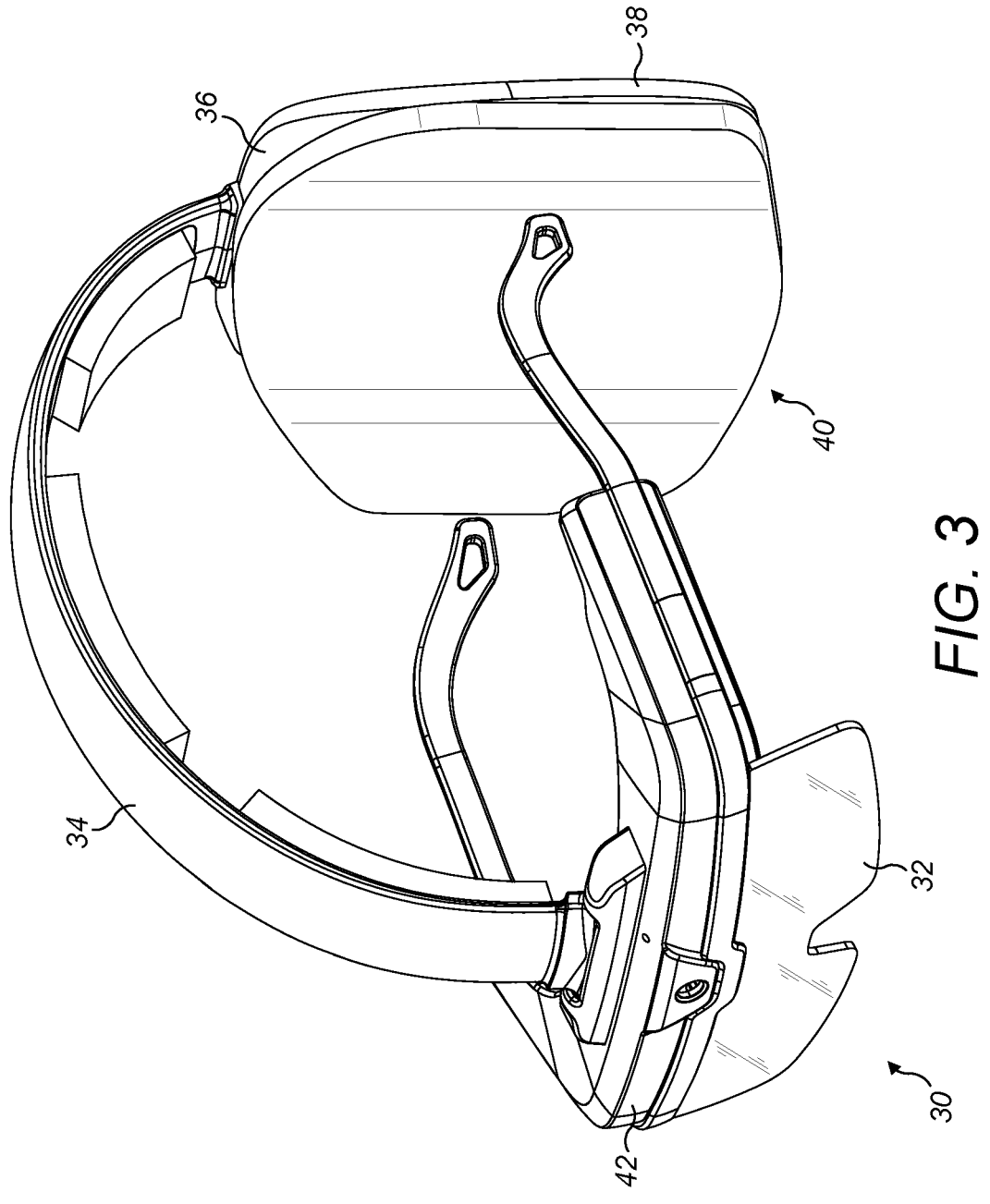
FIG. 3 is a perspective view of an augmented reality headset including a light projector in another embodiment of the disclosure.

FIG. 3 is a perspective view of an augmented reality headset 30. The headset 30 includes a waveguide 32 extending in front of a user's eyes. A headband 34 extends over the top of the user's head. The headband 34 is deformable and elastic so that it can adapt to different sizes of head. A counterweight 36 is provided at the rear of the user's head in order to counteract the weight of the components at the front of the user's head and to increase the comfort of the headset. The counterweight 36 includes control electronics 40 for a projector and a battery 38. Control signals from the control electronics and electrical power cable are carried in the headband 34 towards a projector (not shown) that is integrated within a housing 42 adjacent the user's brow. The projector can operate in the manner described above in order to produce an image and couple it into the waveguide 32. This can allow a user to see the projected image as well as 'real world' light that is transmitted through the transparent waveguide 32.

The invention claimed is:

1. A light projector for an augmented reality headset, comprising:

an image generator configured to provide image-bearing unpolarised light of an image;

a polarising beam splitter configured to:

receive the image-bearing unpolarised light of the image from the image generator at a first side of the polarising beam splitter; and split the image-bearing unpolarised light of the image into a first path and a second path by reflecting first linearly polarised light of a first orientation that is split from the image-bearing unpolarised light of the image into the first path and transmitting second linearly polarised light of a second orientation that is split from the image-bearing unpolarised light of the image into the second path, wherein the first orientation is orthogonal to the second orientation, wherein each of the first linearly polarised light in the first path and the second linearly polarised light in the second path remains image-bearing;

a first optical arrangement including a first mirror and a first quarter-wave plate that is disposed between the first mirror and a second side the polarising beam splitter that is opposite the first side; and a second optical arrangement including a second mirror and a second quarter-wave plate that is disposed between the second mirror and a third side the polarising beam splitter, wherein the first quarter-wave plate of the first optical arrangement is configured to receive the first linearly polarised light of the first orientation that is in the first path from the polarising beam splitter and output first-hand polarised first light to the first mirror that reflects the first-hand polarised first light back to the first quarter-wave plate as second-hand polarised first light without the first mirror outputting light of an additional image, and the first quarter-wave plate transforms the second-hand polarised first light into first linearly polarised light of the second orientation that is output by the first quarter-wave plate to the second side of the polarising beam splitter;

wherein the second quarter-wave plate of the second optical arrangement is configured to receive the second linearly polarised light of the second orientation that is in the second path from the polarising beam splitter and output second-hand polarised second light to the second mirror that reflects the second-hand polarised second light back to the second quarter-wave plate as first-hand polarised second light without the second mirror outputting light of an additional image, and the second quarter-wave plate transforms the first-hand polarised second light into second linearly polarised light of the first orientation that is output by the second quarter-wave plate to the third side of the polarising beam splitter, wherein the polarising beam splitter is configured to receive and combine the first linearly polarised light of the second orientation from the first optical arrangement and the second linearly polarised light of the first orientation from the second optical arrangement so that the combined light, which is unpolarised, is provided to an exit pupil at a fourth side of the polarising beam splitter that is opposite third side, and wherein the first optical arrangement and the second optical arrangement are angled relative to one another so that the image from the image-bearing light in the first path is aligned with the image from the image-bearing light in the second path.

2. The light projector of claim 1, wherein:

the first mirror and the second mirror are configured to focus light.

3. The light projector of claim 2, wherein:

the first mirror and the second mirror are a first concave mirror and a second concave mirror, respectively.

4. The light projector of claim 3, wherein each of the first concave mirror and the second concave mirror is a spherical mirror.

5. The light projector of claim 1, wherein:

the first optical arrangement and the second optical arrangement further comprise a first lens and a second lens respectively for focusing or collimating the light of the first path and second path respectively.

6. The light projector of claim 1, wherein the image generator comprises a LED array.

7. The light projector of claim 6, wherein the image generator comprises a micro LED array.

8. The light projector of claim 1, wherein the polarising beam splitter is a rectangular cuboid comprising a top face corresponding to the fourth side, a bottom face corresponding to the third side, and four side faces including the first side and the second side.

9. A light projector for an augmented reality headset, comprising:

an image generator configured to provide image-bearing unpolarised light of an image;

a beam splitter configured to receive the image-bearing unpolarised light of the image from the image generator at a first side of the beam splitter and to split it into a first path comprising first image-bearing light of a first orientation from the image with unpolarised light and a second path comprising second image-bearing light of a second orientation from the image with unpolarised light;

a first optical arrangement including a first mirror and a first quarter-wave plate that is disposed between the first mirror and a second side of the beam splitter that is opposite the first side; and a second optical arrangement including a second mirror and a second quarter-wave plate that is disposed between the second mirror and a third side of the beam splitter, wherein the first quarter-wave plate of the first optical arrangement is configured to receive the first image-bearing light of the first orientation that is in the first path from the beam splitter and output first-hand polarised first light to the first mirror that reflects the first-hand polarised first light back to the first quarter-wave plate as second-hand polarised first light without the first mirror outputting light of an additional image, and the first quarter-wave plate transforms the second-hand polarised first light into first image-bearing light of the second orientation that is output by the first quarter-wave plate to the second side of the beam splitter;

wherein the second quarter-wave plate of the second optical arrangement is configured to receive the second image-bearing light of the second orientation that is in the second path from the beam splitter and output second-hand polarised second light to the second mirror that reflects the second-hand polarised second light back to the second quarter-wave plate as first-hand polarised second light without the second mirror outputting light of an additional image, and the second quarter-wave plate transforms the first-hand polarised second light into second image-bearing light of the first orientation that is output by the second quarter-wave plate to the third side of the beam splitter; and wherein the beam splitter is configured to receive and combine the first image-bearing light of the second orientation from the first optical arrangement and the second image-bearing light of the first orientation from the second optical arrangement so that the combined image-bearing light, which is unpolarised, is provided to an exit pupil at a fourth side of the beam splitter that is opposite third side, and wherein the first optical arrangement and the second optical arrangement are angled relative to one another so that the image from the first path is aligned with the image from the second path.

10. The light projector of claim 9, wherein:

the first mirror and the second mirror are configured to focus light.

11. The light projector of claim 10, wherein:

the first mirror and the second mirror are a first concave mirror and a second concave mirror, respectively.

12. The light projector of claim 11, wherein each of the first concave mirror and the second concave mirror is a spherical mirror.

13. The light projector of claim 9, wherein:

the first optical arrangement and the second optical arrangement further comprise a first lens and a second lens respectively for focusing or collimating the light of the first path and second path respectively.

14. The light projector of claim 9, wherein the image generator comprises a LED array.

15. The light projector of claim 14, wherein the image generator comprises a micro LED array.

16. The light projector of claim 9, wherein the beam splitter is a rectangular cuboid comprising a top face corresponding to the fourth side, a bottom face corresponding to the third side, and four side faces including the first side and the second side.

17. A method of assembling a light projector for an augmented reality headset, comprising:

providing an image generator configured to provide image-bearing unpolarised light of an image;

arranging a beam splitter to receive the image-bearing unpolarised light of the image from the image generator at a first side of the beam splitter and to split it into a first path comprising first image-bearing light of a first orientation from the image with unpolarised light and a second path comprising second image-bearing light of a second orientation from the image with unpolarised light;

arranging a first optical arrangement including a first mirror and a first quarter-wave plate that is disposed between the first mirror and a second side of the beam splitter that is opposite the first side, the first quarter-wave plate of the first optical arrangement to receive the first image-bearing light of the first orientation that is in the first path from the beam splitter and output first-hand polarised first light to the first mirror that reflects the first-hand polarised first light back to the first quarter-wave plate as second-hand polarised first light without the first mirror outputting light of an additional image, and the first quarter-wave plate transforms the second-hand polarised first light into first image-bearing light of the second orientation that is output by the first quarter-wave plate to the second side of the beam splitter;

arranging a second optical arrangement including a second mirror and a second quarter-wave plate that is disposed between the second mirror and a third side of the beam splitter, the second quarter-wave plate of the second optical arrangement to receive the second image-bearing light of the second orientation that is in the second path from the beam splitter and output second-hand polarised second light to the second mirror that reflects the second-hand polarised second light back to the second quarter-wave plate as first-hand polarised second light without the second mirror outputting light of an additional image, and the second quarter-wave plate transforms the first-hand polarised second light into second image-bearing light of the first orientation that is output by the second quarter-wave plate to the third side of the beam splitter; and aligning the first optical arrangement and the second optical arrangement so that the image from the first path is aligned with the image from the second path when they are combined by the beam splitter and provided to an exit pupil at a fourth side of the beam splitter that is opposite third side with image-bearing unpolarised light.

18. The method of claim 17, wherein:

the first mirror and the second mirror are configured to focus light.

19. The method of claim 17, wherein the image generator is an LED array.

20. The method of claim 17, wherein the beam splitter is a rectangular cuboid comprising a top face corresponding to the fourth side, a bottom face corresponding to the third side, and four side faces including the first side and the second side.

* * * * *